United States Patent
Luo et al.

(10) Patent No.: US 10,759,667 B2
(45) Date of Patent: Sep. 1, 2020

(54) AMPHIPHILIC MOLECULAR SIEVE CONTAINING HYDROPHILIC GROUP ON THE OUTSIDE AND LIPOPHILIC GROUP ON THE INSIDE AND PRODUCTION METHOD THREOF

(71) Applicant: PetroChina Company Limited, Beijing (CN)

(72) Inventors: Jianhui Luo, Beijing (CN); Zongtao Zhang, Beijing (CN); Baoliang Peng, Beijing (CN); Runwei Wang, Beijing (CN); Lipeng He, Beijing (CN); Pingmei Wang, Beijing (CN); Bin Ding, Beijing (CN); Ying Wang, Beijing (CN); Xiangfei Geng, Beijing (CN)

(73) Assignee: PetroChina Company Limited, Beijing (CN)

( * ) Notice: Subject to any disclaimer, the term of this patent is extended or adjusted under 35 U.S.C. 154(b) by 124 days.

(21) Appl. No.: 16/029,215

(22) Filed: Jul. 6, 2018

(65) Prior Publication Data

US 2019/0202705 A1    Jul. 4, 2019

(30) Foreign Application Priority Data

Jan. 3, 2018   (CN) .......................... 2018 1 00035070

(51) Int. Cl.
*C01B 39/38*     (2006.01)
*B01J 29/40*     (2006.01)
*C01B 39/02*     (2006.01)

(52) U.S. Cl.
CPC ............. *C01B 39/026* (2013.01); *B01J 29/40* (2013.01); *C01B 39/38* (2013.01); *B01J 2229/12* (2013.01);
(Continued)

(58) Field of Classification Search
CPC ........ C01B 39/026; C01B 39/38; B01J 29/40; B01J 2229/12; B01J 2229/18;
(Continued)

(56) References Cited

U.S. PATENT DOCUMENTS

| 4,138,363 A | 2/1979 | Hertzenberg et al. |
| 2014/0051883 A1 | 2/2014 | Kim et al. |

(Continued)

FOREIGN PATENT DOCUMENTS

| CN | 1663912 A | 9/2005 |
| CN | 102689911 A | 9/2012 |

(Continued)

OTHER PUBLICATIONS

Wang, Y., "The Modification and Properties of Hierarchical Porous Materials", Chinese Doctoral Dissertations & Master's Theses, published Mar. 15, 2017), 33 pages.

(Continued)

*Primary Examiner* — David M Brunsman
(74) *Attorney, Agent, or Firm* — Hamilton, Brook, Smith & Reynolds, P.C.

(57) ABSTRACT

The present invention provides an amphiphilic molecular sieve containing a hydrophilic group on the outside and a lipophilic group on the inside and a production method thereof. The production method comprises: dispersing the ZSM-5 spherical nano-molecular sieve into toluene, adding thereto an organosilane containing a hydrophilic group and reacting at 40-80° C. for 2-16 h, to obtain a molecular sieve containing a hydrophilic group; placing the molecular sieve containing a hydrophilic group in an aqueous solution of sodium hydroxide and reacting at 50-90° C. for 10-50 min, to obtain a molecular sieve containing a hydrophilic group on the outside; dispersing the molecular sieve containing a hydrophilic group on the outside into toluene, adding thereto (Continued)

an organosilane containing a lipophilic group and reacting at 40-80° C. for 2-12 h, to obtain the amphiphilic molecular sieve containing a hydrophilic group on the outside and a lipophilic group on the inside. The present invention also provides an amphiphilic molecular sieve obtained by the above production method, which contains a hydrophilic group on the outside and a lipophilic group on the inside.

13 Claims, 2 Drawing Sheets

(52) U.S. Cl.
CPC ........ *B01J 2229/14* (2013.01); *B01J 2229/32* (2013.01); *B01J 2229/34* (2013.01); *B01J 2229/38* (2013.01); *B01J 2229/40* (2013.01); *C01P 2002/72* (2013.01); *C01P 2004/03* (2013.01); *C01P 2004/04* (2013.01); *C01P 2004/34* (2013.01); *C01P 2004/36* (2013.01); *C01P 2004/90* (2013.01); *C01P 2006/16* (2013.01)

(58) Field of Classification Search
CPC ............... B01J 2229/32; B01J 2229/38; B01J 2229/40; B01J 2229/14; C01P 2004/34; C01P 2004/36; C01P 2006/90
See application file for complete search history.

(56) References Cited

U.S. PATENT DOCUMENTS

| | | | |
|---|---|---|---|
| 2017/0065927 A1 | 3/2017 | Sauer et al. | |
| 2019/0202704 A1* | 7/2019 | Peng | C01B 39/026 |
| 2019/0202705 A1 | 7/2019 | Luo et al. | |

FOREIGN PATENT DOCUMENTS

| | | |
|---|---|---|
| CN | 104148011 A | 11/2014 |
| CN | 104324747 A | 2/2015 |
| CN | 104477933 A | 4/2015 |
| CN | 105524022 A | 4/2016 |
| CN | 106179511 A | 12/2016 |
| CN | 106809848 A | 6/2017 |

OTHER PUBLICATIONS

Yamamoto, K., et al., Organic-Inorganic Hybrid Zeolites Containing Organic Framewords, Chem. Mater. 2005, 17, 3913-3920.

Yamamoto, K., et al., "ZOL: A New Type of Organic-Inorganic Hybrid Zeolites Containing Organic Framework", Chem. Mater., 2008, 20, 972-980.

Yamamoto, K., et al., "Organic-Inorganic Hybrid Zeolites Containing Organic Frameworks", Science, vol. 300, 470-472 (Apr. 2003).

Cheng-long, L., et al., "Study on hydrophobic silylation modification of high silica molecular sieve ASM-5", Chemical Research and Application, 25(2) 236-239 (Feb. 2013).

Guo, M., et al., "Modification of ZMS-5 zeolite and its application progress in alkylation", Chemical Engineer, 7: 46-50 (2010).

Tsuji, K., et al., "Organic-functionalized molecular sieves (OFMSs) I. Synthesis and characterization of OFMSs with polar functional groups", Microporous and Mesoporous Materials, 29 (1999) 339-349.

Jones, C.W., et al., "Organic-functionalized molecular sieves. III. Shape selective catalysis", Microporous and Mesoporous Materials 42 (2001) 21-35.

Jones, C.W., et al., "Organic-functionalized molecular sieves as shape-selective catalysts", Nature, 393: 52-54 (May 1998).

Astala, R., et al., "The Properties of Methylene-and Amine-Substituted Zeolites from First Principles", J. Am. Chem. Soc. 2004, 126, 1843-1848.

* cited by examiner

AMPHIPHILIC MOLECULAR SIEVE CONTAINING HYDROPHILIC GROUP ON THE OUTSIDE AND LIPOPHILIC GROUP ON THE INSIDE AND PRODUCTION METHOD THREOF

RELATED APPLICATION

This application claims priority under 35 U.S.C. § 119 or 365 to Chinese Application No. 2018100035070, filed Jan. 3, 2018. The entire teachings of the above application are incorporated herein by reference.

FIELD OF INVENTION

The present invention relates to a molecular sieve and a production method thereof, in particular to a molecular sieve having amphiphilic properties and a production method thereof, belonging to the technical field of molecular sieve production.

BACKGROUND ART

The research of nano-molecular sieves has attracted great attention. They have high value in many fields such as fine chemicals, sustained drug release, surfactants, and heterogeneous catalysis, due to their large specific surface areas, many surface-active centers, and strong thermal stability.

There are many methods for surface modification of molecular sieves, and a common method is to react with silane under hydrothermal conditions. This method is mild and effective, and it is widely used in various experiments. The previous silane modification can only allow the surface of the molecular sieve to be covered by the same kind of group. Although the hydrophilic or hydrophobic nature of the material can be regulated, it does not have an amphiphilic activity.

The organic-inorganic composite nanoporous material as a new functional material has attracted wide attention. As compared with traditional zeolites, such material has unique adsorption capacity and high catalytic activity. Many people have studied the synthesis of the organic-inorganic hybrid nanoporous material. Tatsumi and his colleagues (Science 2003, 300, 470-472; Chem. Mater. 2005, 17, 3913-3920; Chem. Mater. 2008, 20, 972-980) synthesized zeolites with LTA-, MFI- and *BEA-type topologies by replacing the oxygen atoms in the framework structure with methylene linked to two silicon atoms. The successful use of organosilanes has added new functions to zeolites, but this approach inevitably leads to structural defects, because the organic groups located in the micropores may destroy their microporosity.

SUMMARY OF THE INVENTION

In order to solve the above technical problem, an object of the present invention is to provide a production method of an amphiphilic molecular sieve containing a hydrophilic group on the outside and a lipophilic group on the inside, which will not destroy the characteristics and structure of the original molecular sieve.

In order to achieve the above technical object, the present invention provides a production method of an amphiphilic molecular sieve containing a hydrophilic group on the outside and a lipophilic group on the inside, characterized in that it comprises the following steps:

step 1: producing a ZSM-5 spherical nano-molecular sieve with a diameter of 50-200 nm;

step 2: dispersing the ZSM-5 spherical nano-molecular sieve into toluene, adding thereto an organosilane containing a hydrophilic group and reacting at 40-80° C. for 2-16 h, followed by centrifugation, washing and drying, to obtain a molecular sieve containing a hydrophilic group; wherein the amount of substance of the toluene is 40-80 times that of the ZSM-5 spherical nano-molecular sieve, and the amount of substance of the organosilane containing a hydrophilic group is 4-8 times that of the ZSM-5 spherical nano-molecular sieve;

step 3: placing the molecular sieve containing a hydrophilic group in an aqueous solution of sodium hydroxide and reacting at 50-90° C. for 10-50 min, followed by centrifugation, washing and drying, to obtain a molecular sieve containing a hydrophilic group on the outside;

step 4: dispersing the molecular sieve containing a hydrophilic group on the outside into toluene, adding thereto an organosilane containing a lipophilic group and reacting at 40-80° C. for 2-12 h, followed by centrifugation, washing and drying, to obtain the amphiphilic molecular sieve containing a hydrophilic group on the outside and a lipophilic group on the inside; wherein the amount of substance of the toluene is 40-80 times that of the molecular sieve containing a hydrophilic group on the outside, and the amount of substance of the organosilane containing a lipophilic group is 4-8 times that of the molecular sieve containing a hydrophilic group on the outside.

In the above production method, the employed ZSM-5 spherical nano-molecular sieve with a diameter of 50-200 nm is produced by a method disclosed in Chinese Patent Application Publication No. CN102689911A (Zhang Zongqi, Gao Xiaohui, Xu Diou, Yan Lijun, Wang Runwei, Zhou Zhiyuan et al. Preparation method of ZSM-5 molecular sieve nanosphere with multi-level pore hollow structure) to obtain a nano-ZSM-5 molecular sieve having a diameter of 50-200 nm.

In the above production method, preferably, the organosilane containing a hydrophilic group used has a structural formula as shown below:

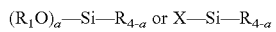

Wherein $R_1$ is —$CH_3$, —$C_2H_5$ or H;

R is a hydrophilic group such as —$NH_2$, COOH, —CN or —SH;

X is halogen; and a is 1, 2 or 3.

In the above production method, preferably, the organosilane containing a hydrophilic group used is 3-aminopropyltriethoxysilane, 2-cyanoethyltriethoxysilane or 3-mercaptopropylmethyltriethoxysilane.

In the above production method, preferably, in the step 3, the concentration of the aqueous solution of sodium hydroxide used is 0.1-4 mol/L.

In the above production method, preferably, in the step 3, when the concentration of the aqueous solution of sodium hydroxide is less than 0.5 mol/L, and the alkali etching time is less than 30 min, the obtained amphophilic molecular sieve containing a hydrophilic group on the outside and a lipophilic group on the inside has a hollow structure;

when the concentration of the aqueous solution of sodium hydroxide is more than 0.5 mol/L, and the alkali etching time is more than 30 min, the obtained amphophilic molecular sieve containing a hydrophilic group on the outside and a lipophilic group on the inside has a half-shell structure.

In the above production method, preferably, in the step 3, the rotate speed of the centrifugation is 5000-10000 rpm, and the duration of the centrifugation is 5-8 min.

In the above production method, preferably, in the step 3, the washing is performed 1-2 times with ethanol.

In the above production method, preferably, in the step 3, the drying is performed at 50-80° C. for 5-12 h.

In the above production method, preferably, the organosilane containing a lipophilic group has a structural formula as shown below:

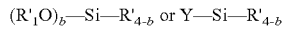

wherein $R'_1$ is —$CH_3$, —$C_2H_5$ or H;

R' is a lipophilic group such as benzene ring, linear alkane or cycloalkane;

Y is halogen;

b is 1, 2 or 3.

In the above production method, preferably, the organosilane containing a lipophilic group used is methyltriethoxysilane, cetyltrimethoxysilane, n-octyltrichlorosilane, or cyclohexylmethyldimethoxysilane.

In the above production method, preferably, in the step 2, the rotate speed of the centrifugation is 5000-10000 rpm, and the duration of the centrifugation is 5-8 min.

In the above production method, preferably, in the step 2, the washing is performed with toluene (3-5 times) and then trichloromethane (1-2 times).

In the above production method, preferably, in the step 2, the temperature of the drying is 50-80° C., and the duration of the drying is 5-12 h.

In the above production method, preferably, in the step 4, the rotate speed of the centrifugation is 5000-10000 rpm, and the duration of the centrifugation is 5-8 min.

In the above production method, preferably, in the step 4, the washing is performed with toluene (3-5 times) and then trichloromethane (1-2 times).

In the above production method, preferably, in the step 4, the temperature of the drying is 50-80° C., and the duration of the drying is 5-12 h.

In the above production method, in the step 2 and the step 4, the washing is performed with trichloromethane.

The present invention also provides an amphiphilic molecular sieve containing a hydrophilic group on the outside and a lipophilic group on the inside produced by the production method as described above.

In the above amphiphilic molecular sieve, preferably, the amphiphilic molecular sieve has a diameter of 50-200 nm, a half-shell structure, a microporous MFI type structure with a pore size of 0.57 nm, a hydrophilic group on the outside, and a lipophilic group on the inside.

The production method of an amphiphilic molecular sieve containing a hydrophilic group on the outside and a lipophilic group on the inside of the present invention introduces lipophilic and hydrophilic groups on the inner surface and the outer surface of the molecular sieve, respectively, to obtain an amphiphilic molecular sieve containing hydrophilic and lipophilic groups. This applies to various molecular sieves and various organosilanes, and the structural parameters are highly controllable.

The production method of an amphiphilic molecular sieve containing a hydrophilic group on the outside and a lipophilic group on the inside of the present invention can adjust the morphology of the obtained amphiphilic molecular sieve by changing the length of alkali etching time and the concentration of alkali solution. For example, when the concentration of alkali etching is less than 0.5 mol/L, and the alkali etching time is less than 30 min, the obtained molecular sieve has a hollow structure; when the concentration of alkali etching is more than 0.5 mol/L, and the alkali etching time is more than 30 min, the obtained molecular sieve has a half-shell structure.

The production method of an amphiphilic molecular sieve containing a hydrophilic group on the outside and a lipophilic group on the inside of the present invention can modulate and change the hydrophilicity and hydrophobicity of the material by selective modification of the nanomolecular sieve, so as to obtain a low-cost, asymmetrically modified nano-functional material. The double-sided lipophilic and hydrophilic modified molecular sieve can be carried with water and has surfactant characteristics after double-side modification. At the same time, it can take advantage of the properties of small size and large specific surface area of a nanomaterial, has good foaming and foam-stabilizing property and can realize the encapsulation of hydrophilic and lipophilic components.

The production method of an amphiphilic molecular sieve containing a hydrophilic group on the outside and a lipophilic group on the inside of the present invention performs amphiphilic asymmetric modification on the basis of nano-sized molecular sieve by linking the hydrophilic and lipophilic organosilanes, so that the finally obtained amphiphilic molecular sieve has both hydrophilic and lipophilic properties.

The production method of an amphiphilic molecular sieve containing a hydrophilic group on the outside and a lipophilic group on the inside of the present invention is simple and efficient, and the produced amphiphilic molecular sieve has uniform and controllable size, while maintaining the nature of the molecular sieve itself. The half shell contains microporous channels, the outer surface contains a hydrophilic group and the inside has a lipophilic character. It can be used for catalytic cracking of water and oil mixed systems. Selective modification of the silicon nanoparticles can modulate the hydrophilicity and hydrophobicity of the material, resulting in a low-cost, asymmetrically modified nano-functional material.

The amphiphilic molecular sieve containing a hydrophilic group on the outside and a lipophilic group on the inside of the present invention can be carried with water and has surfactant characteristics after double-side modification. At the same time, it can take advantage of the properties of small size and large specific surface area of a nanomaterial, has good foaming and foam-stabilizing property and can realize the encapsulation of hydrophilic and lipophilic components.

DETAILED DESCRIPTION OF PREFERRED EMBODIMENTS

In order to more clearly understand the technical features, objects, and advantages of the present invention, the technical solutions of the present invention will be described in detail below, but it should not be construed as limiting the scope of the present invention.

Example 1

This example provides a production method of an amphiphilic molecular sieve containing a hydrophilic group on the outside and a lipophilic group on the inside, comprising the following steps:

stirring 5 g of tetrapropylammonium hydroxide, 10 g of deionized water, 0.6 g of 1 mol/L sodium hydroxide solution, 0.1 g of aluminum source (aluminum isopropoxide powder), 10 mL of silicon source (ethyl orthosilicate) sufficiently and reacting under hydrothermal conditions for 24 h; centrifuging, washing, drying and sintering to obtain a precursor nano-ZSM-5 molecular sieve material;

dispersing the precursor in 50 mL of toluene, and then adding thereto 1 mL of KH550 organosilane; heating in a water bath at 80° C. for 6 hours, centrifuging and drying, to obtain a molecular sieve containing a hydrophilic group;

adding the molecular sieve containing a hydrophilic group to a 0.5 mol/L NaOH solution, and treating in a water bath at 80° C. for 30 min, washing by centrifugation with water and ethanol at 5000 rpm for 5 min, and drying at 50° C. for 5 h, to obtain a molecular sieve containing a hydrophilic group on the outside;

dispersing the molecular sieve containing a hydrophilic group on the outside in 50 ml of toluene, and then adding thereto 1 mL of cetyltrimethoxysilane; heating in a water bath at 80° C. for 6 hours, and washing the resultant product with trichloromethane and drying, to obtain a half-shell material of molecular sieve containing a hydrophilic group on the outside and a lipophilic group on the inside.

Figure 1:
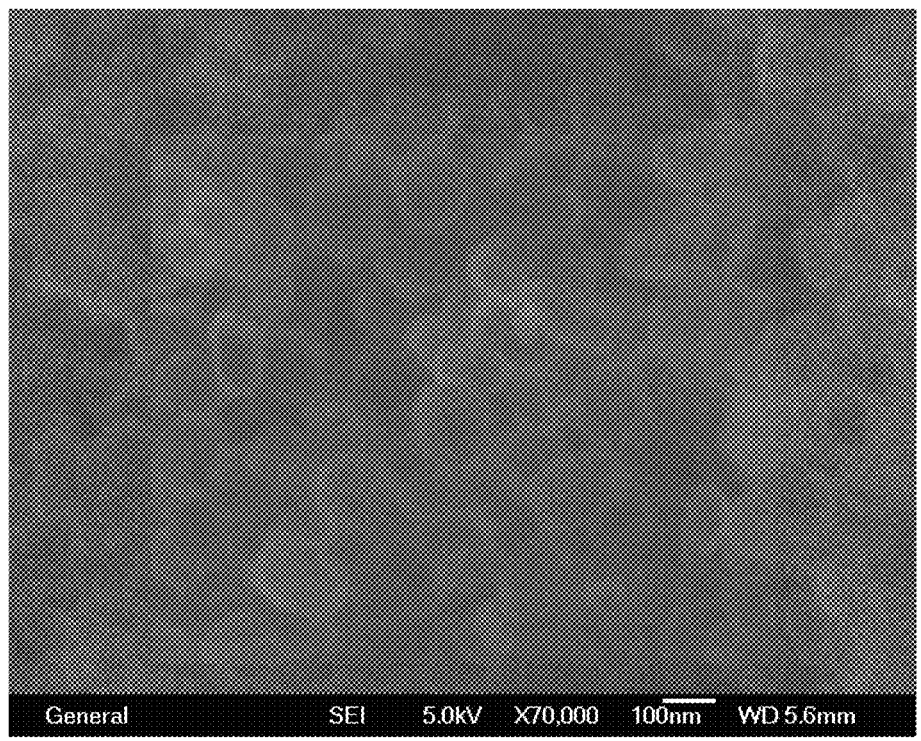
FIG. 1 is a scanning electron microscope (SEM) image of the amphiphilic molecular sieve containing a hydrophilic group on the outside and a lipophilic group on the inside according to Example 1.

The SEM image of the amphiphilic molecular sieve containing a hydrophilic group on the outside and a lipophilic group on the inside of this example is shown in FIG. 1. As seen from FIG. 1, the finally obtained molecular sieve is a half-shell nanoscale molecular sieve material with a particle size of about 100 nm.

Figure 2:
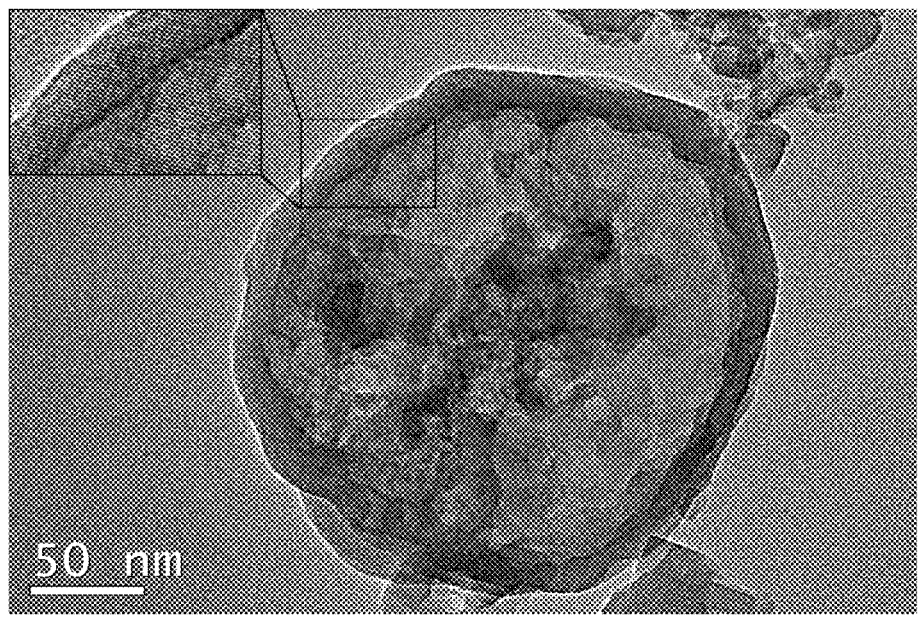
FIG. 2 is a transmission electron microscope (TEM) image of the amphiphilic molecular sieve containing a hydrophilic group on the outside and a lipophilic group on the inside according to Example 1.
Figure 3:
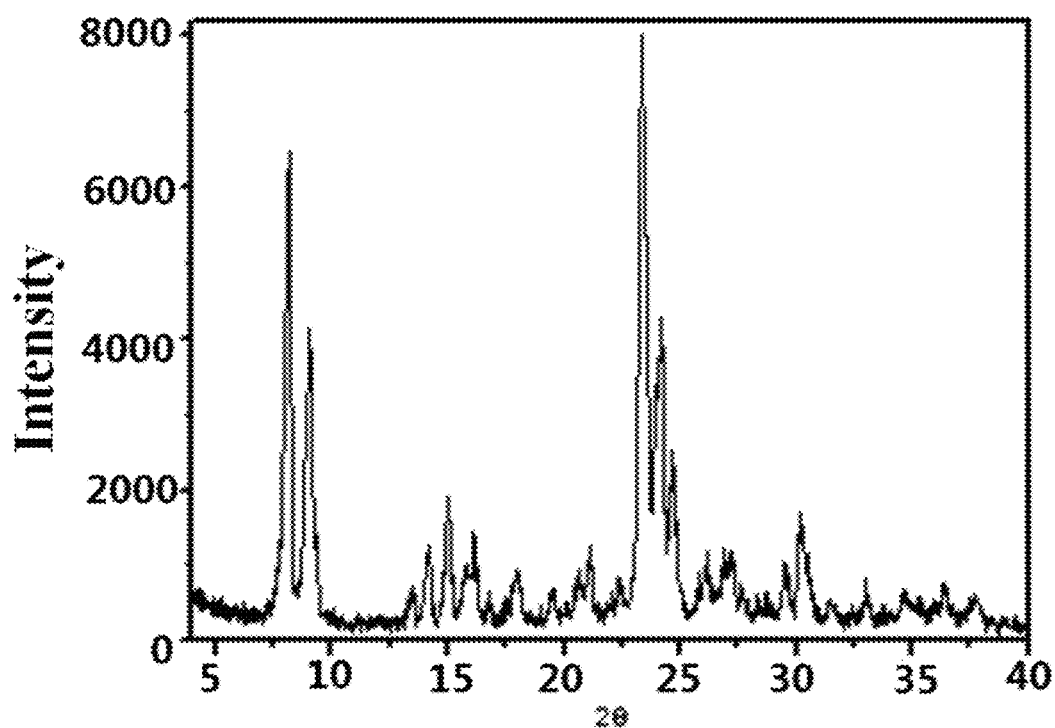
FIG. 3 is a wide-angle XRD spectrum of the amphiphilic molecular sieve containing a hydrophilic group on the outside and a lipophilic group on the inside according to Example 1.

The TEM image is shown in FIG. 2. An obvious half-shell structure can be seen in FIG. 2, and the microporous structure can be clearly seen from the shell wall, which fully demonstrates that the sample maintains the microporous characteristics of the molecular sieve itself intact. This conclusion can also be verified by the wide-angle XRD spectrum of the sample in FIG. 3. The characteristic peaks of the sample in the XRD of the sample completely coincide with those of the MFI-type molecular sieve.

A sample of 0.1 g is placed in a mixed solution of 10 mL of decalin and 10 mL of brine with a concentration of 1 mol/L. After left standing, the sample is in the middle of the solution and has a certain thickness of emulsified layer. This conclusion macroscopically embodies the amphiphilic (hydrophilic and lipophilic) properties of the molecular sieve. The precipitation in the lower part of the water layer can be attributed to the partial damage of the sample during the alkaline etching process.

Example 2

The example provides a production method of a nanoscale molecular sieve pellet, specifically comprising the following steps:

stirring 5 g of tetrapropylammonium hydroxide, 10 g of deionized water, 0.6 g of 1 mol/L sodium hydroxide solution, 0.1 g of aluminum source (aluminum isopropoxide powder), 10 mL of silicon source (ethyl orthosilicate) sufficiently and reacting under hydrothermal conditions for 24 h;

centrifuging, washing, drying and sintering to obtain a nanoscale ZSM-5 molecular sieve.

Figure 4:
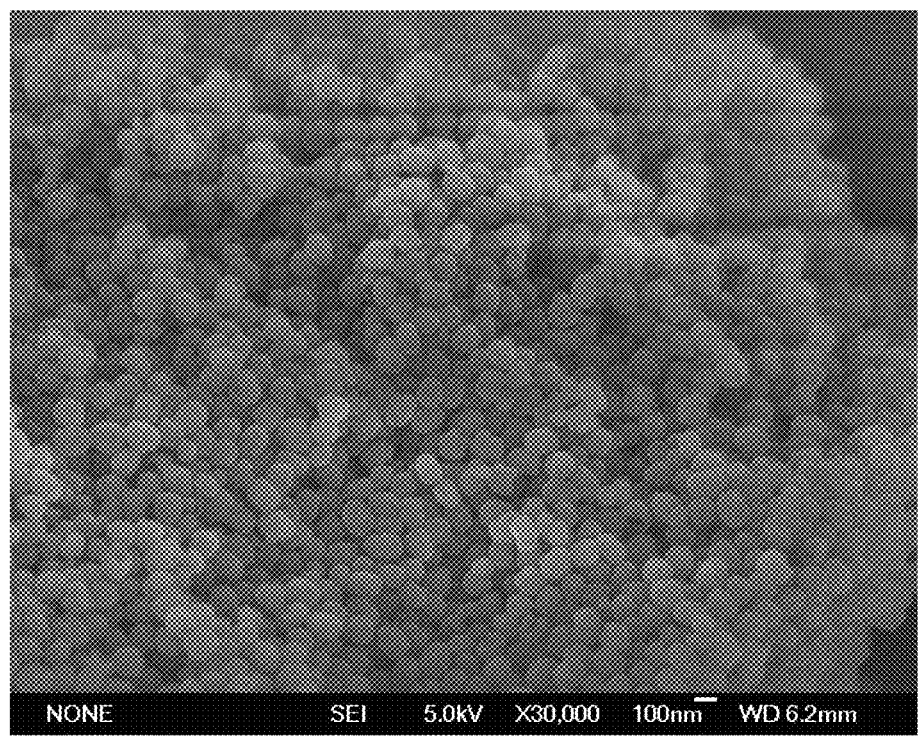
FIG. 4 is a SEM image of the precursor sample according to Example 2.

The nanoscale molecular sieve pellet in this example has a particle size of 100-150 nm and contains a microporous structure, and the SEM image of this molecular sieve is shown in FIG. 4.

Example 3

This example provides an amphiphilic molecular sieve containing a hydrophilic group on the outside and a lipophilic group on the inside obtained by the following steps:

stirring 5 g of tetrapropylammonium hydroxide, 10 g of deionized water, 0.6 g of 1 mol/L sodium hydroxide solution, 0.1 g of aluminum source (aluminum isopropoxide powder), 10 mL of silicon source (ethyl orthosilicate) sufficiently and reacting under hydrothermal conditions for 24 h; centrifuging, washing, drying and sintering to finally obtain a precursor ZSM-5 molecular sieve;

dispersing the precursor in 50 mL of toluene, and then adding thereto 1 mL of KH550 organosilane; heating in a water bath at 80° C. for 6 hours, centrifuging and drying, to obtain a molecular sieve containing a hydrophilic group;

adding the molecular sieve containing a hydrophilic group to a 0.5 mol/L NaOH solution, and treating in a water bath at 65° C. for 20 min, washing by centrifugation with water and ethanol, and drying to obtain a molecular sieve containing a hydrophilic group on the outside;

dispersing the molecular sieve containing a hydrophilic group on the outside in 50 ml of toluene, and then adding thereto 1 mL of cetyltrimethoxysilane; heating in a water bath at 80° C. for 6 hours, centrifuging and drying, to obtain ZSM-5 having hydrophilic and lipophilic functional groups.

The appearance of the sample obtained in this example has a partial half-shell structure and a partial full-shell structure, and this phenomenon can be regulated by changing the alkali etching time and the alkali concentration.

Example 4

This example provides an amphiphilic molecular sieve containing a hydrophilic group on the outside and a lipophilic group on the inside obtained by the following steps:

stirring 5 g of tetrapropylammonium hydroxide, 10 g of deionized water, 0.6 g of 1 mol/L sodium hydroxide solution, 0.1 g of aluminum source (aluminum isopropoxide powder), 10 mL of silicon source (ethyl orthosilicate) sufficiently and reacting under hydrothermal conditions for 24 h; centrifuging, washing, drying and sintering to finally obtain a precursor ZSM-5 molecular sieve;

dispersing the precursor in 50 mL of toluene, and then adding thereto 1 mL of KH550; heating in a water bath at 60° C. for 4 hours, centrifuging and drying, to obtain a molecular sieve containing a hydrophilic group;

adding the molecular sieve containing a hydrophilic group to a 0.5 mol/L NaOH solution, and treating in a water bath at 65° C. for 20 min, washing by centrifugation with water and ethanol, and drying to obtain a molecular sieve containing a hydrophilic group on the outside;

dispersing the molecular sieve containing a hydrophilic group on the outside in 50 ml of toluene, and then adding thereto 1 mL of cetyltrimethoxysilane; heating in a water bath at 90° C. for 8 hours, centrifuging and drying, to obtain ZSM-5 having both hydrophilic and lipophilic functional groups.

The position and thickness of the emulsified layer of the molecular sieve obtained according to this Example in decalin and saline are completely the same as those in Example 1, which indicates that the time and temperature in the organosilane modification reaction have no effect on the reaction within a certain range.

It can be seen from the above examples that the degree of hydrophilicity and lipophilicity of the molecular sieve can be adjusted by changing the alkali etching conditions, and the organosilane modification conditions do not affect the molecular sieve within a certain range The above examples illustrate that the production method of the amphiphilic molecular sieve containing a hydrophilic group on the outside and a lipophilic group on the inside of the present invention is simple and efficient, and the produced amphiphilic molecular sieve has uniform and controllable size, while maintaining the nature of the molecular sieve itself. The half shell contains microporous channels, and the outer surface contains a hydrophilic group and the inside has a lipophilic character.

The invention claimed is:

1. A method of producing an amphiphilic molecular sieve containing a hydrophilic group on the outside and a lipophilic group on the inside, comprising:
   a) producing a ZSM-5 spherical nano-molecular sieve with a diameter of 50-200 nm;
   b) dispersing the ZSM-5 spherical nano-molecular sieve into toluene, adding thereto an organosilane containing a hydrophilic group and reacting at 40-80° C. for 2-16 h, followed by centrifugation, washing and drying, to obtain a molecular sieve containing a hydrophilic group; wherein the amount of substance of the toluene is 40-80 times that of the ZSM-5 spherical nano-molecular sieve, and the amount of substance of the organosilane containing a hydrophilic group is 4-8 times that of the ZSM-5 spherical nano-molecular sieve;
   c) placing the molecular sieve containing a hydrophilic group in an aqueous solution of sodium hydroxide and reacting at 50-90° C. for 10-50 min, followed by centrifugation, washing and drying, to obtain a molecular sieve containing a hydrophilic group on the outside; and
   d) dispersing the molecular sieve containing a hydrophilic group on the outside into toluene, adding thereto an organosilane containing a lipophilic group and reacting at 40-80° C. for 2-12 h, followed by centrifugation, washing and drying, to obtain the amphiphilic molecular sieve containing a hydrophilic group on the outside and a lipophilic group on the inside; wherein the amount of substance of the toluene is 40-80 times that of the molecular sieve containing a hydrophilic group on the outside, and the amount of substance of the organosilane containing a lipophilic group is 4-8 times that of the molecular sieve containing a hydrophilic group on the outside.

2. The method according to claim 1, wherein the organosilane containing a hydrophilic group has a structural formula as shown below:

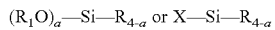

$(R_1O)_a$—Si—$R_{4-a}$ or X—Si—$R_{4-a}$ wherein $R_1$ is —$CH_3$, —$C_2H_5$ or H;
R is —$NH_2$, COOH, —CN or —SH;
X is halogen; and
a is 1, 2 or 3.

3. The method according to claim 1, wherein the organosilane containing a hydrophilic group is 3-aminopropyltriethoxysilane, 2-cyanoethyltriethoxysilane or 3-mercaptopropylmethyltriethoxysilane.

4. The method according to claim 1, wherein in c), the concentration of the aqueous solution of sodium hydroxide is 0.1-4 mol/L.

5. The method according to claim 1, wherein in c), when the concentration of the aqueous solution of sodium hydroxide is less than 0.5 mol/L, and the alkali etching time is less than 30 min, the obtained amphophilic molecular sieve containing a hydrophilic group on the outside and a lipophilic group on the inside has a hollow structure;
when the concentration of the aqueous solution of sodium hydroxide is more than 0.5 mol/L, and the alkali etching time is more than 30 min, the obtained amphophilic molecular sieve containing a hydrophilic group on the outside and a lipophilic group on the inside has a half-shell structure.

6. The method according to claim 1, wherein in c), the rotate speed of the centrifugation is 5000-10000 rpm, and the duration of the centrifugation is 5-8 min.

7. The method according to claim 1, wherein in c), the washing is performed 1-2 times with ethanol.

8. The method according to claim 1, wherein in c), the drying is performed at 50-80° C. for 5-12 h.

9. The method according to claim 1, wherein the organosilane containing a lipophilic group has a structural formula as shown below:

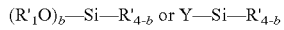

$(R'_1O)_b$—Si—$R'_{4-b}$ or Y—Si—$R'_{4-b}$

Wherein $R'_1$ is —$CH_3$, —$C_2H_5$ or H;
R' is a benzene ring, linear alkane or cycloalkane;
Y is halogen;
b is 1, 2 or 3.

10. The method according to claim 1, wherein the organosilane containing a lipophilic group is methyltriethoxysilane, cetyltrimethoxysilane, n-octyltrichlorosilane, or cyclohexylmethyldimethoxysilane.

11. The method according to claim 1, wherein in b) and d), the rotate speed of the centrifugation is 5000-10000 rpm, and the duration of the centrifugation is 5-8 min.

12. The method according to claim 1, wherein in b) and d), the washing is washing with toluene followed by washing with trichloromethane.

13. The method according to claim 1, wherein in b) and d), the temperature of the drying is 50-80° C., and the duration of the drying is 5-12 h.

* * * * *